United States Patent [19]
Archer

[11] Patent Number: 5,927,478
[45] Date of Patent: Jul. 27, 1999

[54] INPUT STATION FOR BELT CONVEYOR

[75] Inventor: Neil F. Archer, Paducah, Ky.

[73] Assignee: Arch Environmental Equipment, Inc., Paducah, Ky.

[21] Appl. No.: 08/853,822

[22] Filed: May 9, 1997

[51] Int. Cl.$^6$ .................................................. B65G 15/08
[52] U.S. Cl. .......................... 198/823; 198/841; 198/830
[58] Field of Search ..................................... 198/823, 830, 198/841

[56] References Cited

U.S. PATENT DOCUMENTS

| | | |
|---|---|---|
| 1,499,832 | 7/1924 | Landahl et al. . |
| 2,731,138 | 1/1956 | Parisi . |
| 2,969,878 | 1/1961 | Finney, Jr. . |
| 3,707,222 | 12/1972 | Hartley . |
| 4,789,056 | 12/1988 | Bourbeau . |
| 4,793,470 | 12/1988 | Andersson . |
| 4,898,272 | 2/1990 | Swinderman et al. . |
| 4,989,727 | 2/1991 | Gordon . |
| 5,048,669 | 9/1991 | Swinderman . |
| 5,350,053 | 9/1994 | Archer . |
| 5,368,154 | 11/1994 | Campbell . |
| 5,467,866 | 11/1995 | Swinderman . |
| 5,590,757 | 1/1997 | Walter et al. . |

FOREIGN PATENT DOCUMENTS 2510407  9/1976  Germany .

*Primary Examiner*—Joseph E. Valenza
*Attorney, Agent, or Firm*—Dorn, McEachran, Jambor & Keating

[57] ABSTRACT

An input station for a wide continuous conveyor belt that moves in a conveyor run through an input station to a discharge location, around a head pulley, through a return run around a tail pulley, and back into the input station. At the input station the belt rides on a plurality of N conventional central support rollers each mounted between two inner stanchions. A plurality of at least 2N elongated, flat, stationary slider rails support each extreme outer edge of the conveyor belt through the input station. There are 2N troughing rolls, one at each end of each central roller, between the slider rails and the central rollers. 2N fixed inner stanchions support each central roller and one end of each of its troughing rollers. 2N fixed medial support members each support one end of a troughing roller. The slider rails are supported by the medial support members and by 2N outer stanchions.

5 Claims, 2 Drawing Sheets

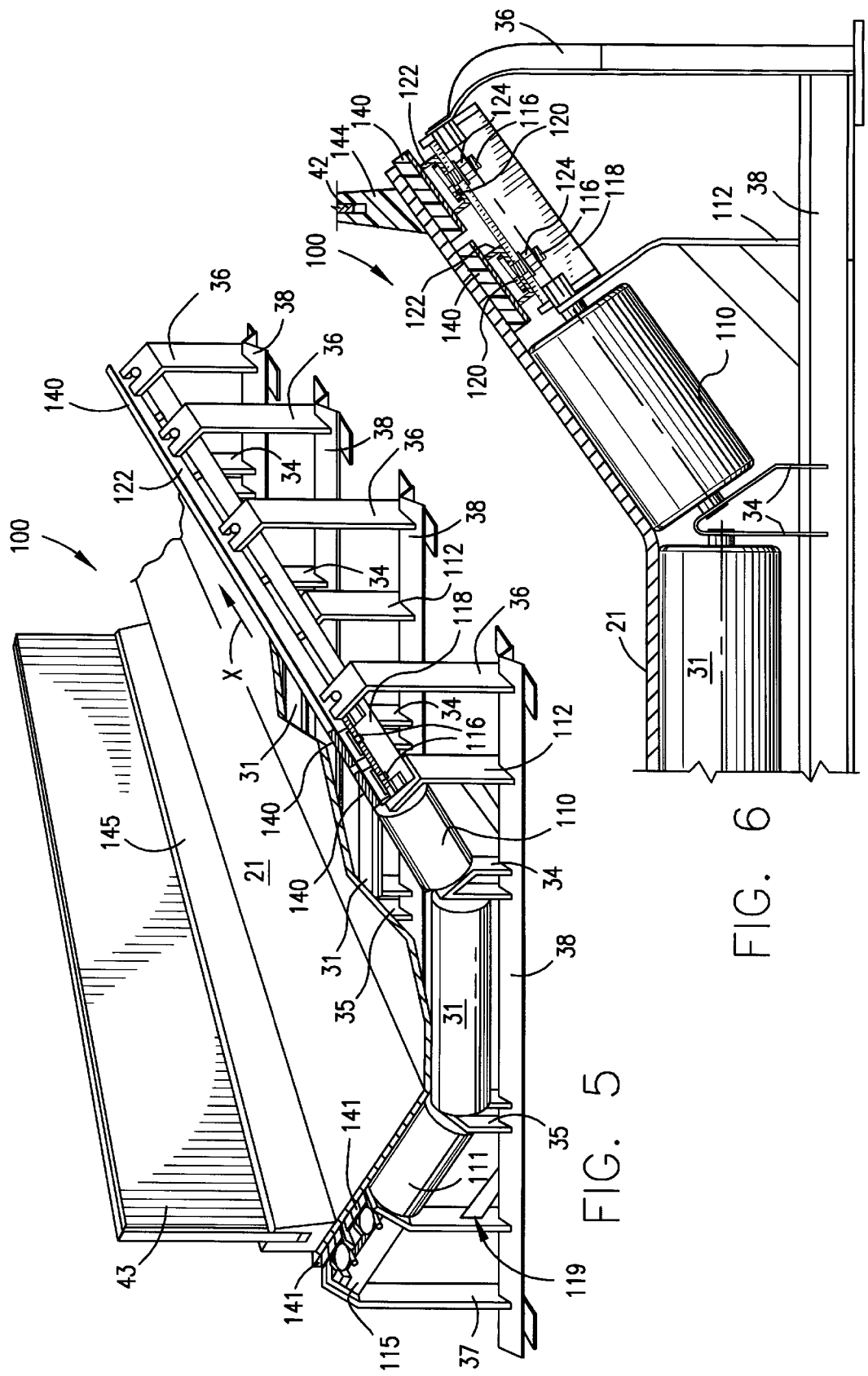

INPUT STATION FOR BELT CONVEYOR

BACKGROUND OF THE INVENTION

There are many applications, in mining and in other industries, in which continuous belt conveyors move bulk materials such as coal, grain, and the like from one location to another. In any such system the bulk material is deposited on the moving conveyor belt; interruption of belt movement to receive a new input is not economically feasible.

One major problem in the input station of any continuous conveyor belt system is leakage of the bulk material. Broadly speaking, this has been met to a substantial extent by resilient aprons affixed to lower edges of rigid skirtboards at the input station. Examples of previously known resilient skirtboard aprons and their mounts are disclosed in Gordon U.S. Pat. No. 4,231,471, U.S. Pat. No. 4,436,446, U.S. Pat. No. 4,877,125, and U.S. Pat. No. 4,989,727. Perhaps the best such skirtboard apron is the simple but effective device described and claimed in Gordon U.S. Pat. No. 4,989,727, sold commercially by Arch Environmental Equipment, Inc. of Paducah, Ky. under the Trademark ATLASTASEAL®. Even that skirtboard apron, however, may have leakage problems, particularly if there is appreciable movement of the conveyor belt, vertically or laterally, through the input station.

It has been conventional, in the input stations for continuous belt conveyors, to support the conveyor belt in a generally open upwardly-facing U-shaped configuration through the input station on three separate series of support rollers. This input station configuration has one set of central horizontal support rollers for the center of the belt. On each side there is another set of support rollers projecting upwardly at an acute angle and supporting a side portion of the belt.

Inevitably, there is some sagging of the belt between each set of support rollers, with resulting leakage problems. This kind of leakage has been reduced in some instances by modifying the input station to afford a plurality of elongated stationary support rails the conveyor belt; the outer side portions of the belt are supported at an acute angle to the center portion of the belt. However, the benefit of the resulting reduction in leakage is partially offset by increased drag on the conveyor belt. A further improved conveyor belt input station provided by the kit disclosed in Archer U.S. Pat. No. 5,350,053. But that conveyor belt input station is not always entirely satisfactory, particularly for heavily loaded conveyor belts having a width of four feet (120 cm) or more.

SUMMARY OF THE INVENTION

It is a principal object of the present invention, therefore, to provide a new and improved input station for a wide continuous belt conveyor of the kind used in mines, coal preparation stations, power stations, and other industrial applications for movement of large quantities of bulk materials from one location to another.

Another object of the invention is to provide a new and improved input station for a wide continuous belt conveyor employed to transport large quantities of bulk materials from one location to another, which input station reduces leakage of the bulk material at the conveyor input while at the same time avoiding undue frictional drag on the belt, so that belt life is maximized.

Accordingly, the invention relates to an improved input station for a belt conveyor of the kind including a continuous closed-loop conveyor belt having a width greater than four feet, the conveyor belt moving in a given direction through an input station in a conveyor run, around a head pulley at a discharge location distant from the input station, and back into the input station in an empty return run around a tail pulley. The improved input station comprises a plurality of N fixed frame members each extending transversely of the width of the conveyor belt. There are 2N fixed outer stanchions, each pair of outer stanchions each being mounted on and projecting upwardly of a fixed frame member beyond the outer edge of the conveyor belt. There are also 2N fixed inner stanchions each pair of inner stanchions mounted in spaced relation to each other and in spaced relation to a pair of the outer stanchions. Furthermore, here are 2N medial support members, each medial support member disposed between an outer stanchion and its related inner stanchion. N horizontal center rolls, each extending between one pair of inner stanchions, support a central portion of the conveyor belt through the input station. 2N troughing rollers, each troughing roller extending between an inner stanchion and a medial support member, support the inner, opposite side portions of the conveyor belt throughout the input station. 2N belt support rails each extend through the input station, support the outer side portions of the conveyor belt. 2N sets of mounting means, one for each belt support rail, for mount each belt support rail between the outer stanchions and the medial stanchions.

BRIEF DESCRIPTION OF THE DRAWINGS

FIG. 5 is a perspective view, partly in cross-section, of an input station for a belt conveyor constructed in accordance with a preferred embodiment of the present invention; and FIG. 6 is a transverse sectional elevation view of one-half of a belt conveyor input station like that of FIG. 5.

DESCRIPTION OF THE PRIOR ART INPUT STATION (FIGS. 1–4)

Figure 1:
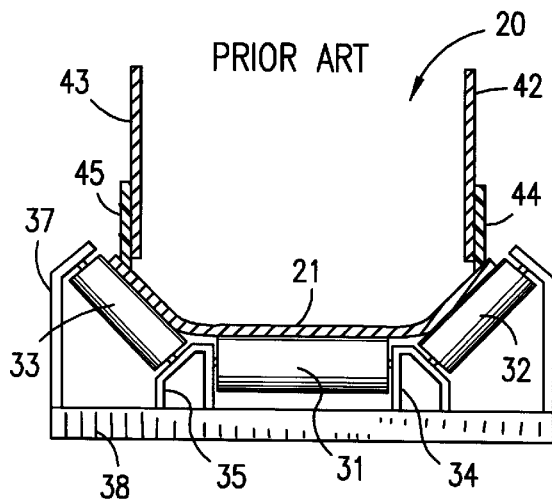
FIGS. 1–3 are simplified cross-sectional elevation views illustrative of prior art input stations for continuous belt conveyor systems.

FIG. 1 illustrates a well known construction used for the input station 20 of a belt conveyor of the kind comprising a continuous conveyor belt 21. Conveyor bell 21 may be utilized in a conveyor system of the kind shown schematically in FIG. 4; belt 21 extends, in a conveyor run 28, through the input station to and around a head pulley 22 that rotates in the direction indicated by arrow A. Head pulley 22 is positioned at a discharge location 23 where the bulk material 24 carried by belt 21 is discharged as indicated by arrow C, FIG. 4. The conveyor system usually includes one or more belt scrapers (not shown) at or near the discharge location 23. From the head pulley 22 conveyor belt 21 extends on a return run 25 that may include an idler 26, to and around a tail pulley 27 that rotates in the direction indicated by arrow B. Thus, the continuous belt 21 comes back to its conveyor run 28 through input station 20 to the discharge location 23.

In a conventional input station 20, FIG. 1, the conveyor belt 21 is supported on a plurality of center support rollers 31 and on two sets of side support rollers 32 and 33. Each center support roller 31 is mounted between a pair of fixed stanchions 34 and 35. Each side belt support roller 32 on one side of belt 21 is mounted between one of the central stanchions 34 and a side stanchion 36. At the other side of belt 21, the support roller 33 in each set is mounted between the second central stanchion 35 and a side stanchion 37. The stanchions 34–37 are affixed to and supported by a suitable base or frame member 38.

Figure 4:
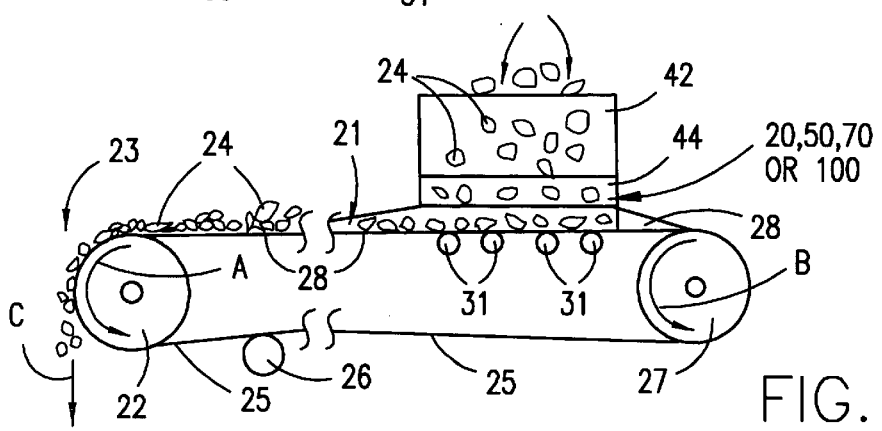
FIG. 4 is a simplified schematic illustration of a continuous belt conveyor system.

The conventional input station 20 of FIG. 1 further comprises two rigid vertical outer skirtboards 42 and 43 located above opposite sides of the input station. A resilient skirtboard apron 44 mounted on skirtboard 42 extends downwardly into engagement with the right-hand side edge portion of belt 21 supported on roller 32. Similarly, there is a second skirtboard apron 45 mounted on skirtboard 43 and projecting downwardly into engagement with the left-hand edge of belt 21 supported on roller 33. One set of support rollers 31–33 is shown in FIG. 1, but the conventional input station 20 incorporates a substantial number of sets of center and side rollers throughout the length of the input station as schematically indicated by rollers 31 in FIG. 4. Skirtboards 42 and 43 and their respective aprons 44 and 45 usually have substantial length in the direction of movement of conveyor belt 21, also as generally indicated in FIG. 4. Preferably, the skirtboards extend for the full length of the input station. In FIG. 1 the movement of belt 21 is toward the plane of the drawing.

If the elements of input station 20 all worked perfectly, keeping belt 21 taut and flat as shown schematically FIG. 4, there would be little or no leakage problem. In real life, this does not happen. Rather, belt 21 sags a bit between each of the support rollers, particularly in the direction of belt movement. As a consequence, there is often a substantial leakage problem around the bottom of each of the two aprons 44 and 45 in the input station 20.

Figure 2:
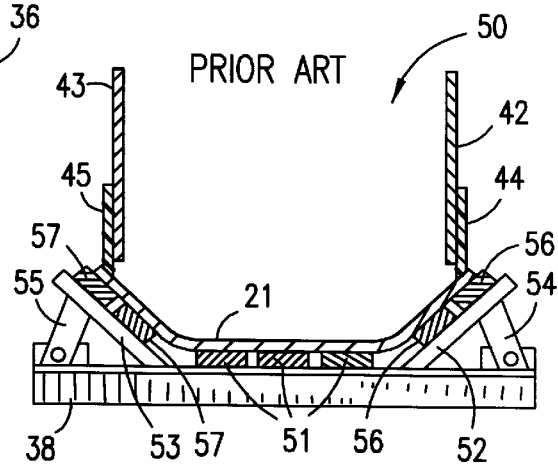

FIG. 2 illustrates another known form of input station 50. In this instance, the frame member 38 supports a plurality of belt support rails 51 that extend longitudinally down the center of the input station. As with FIG. 1, the direction of movement of conveyor belt 21 in FIG. 2 is toward the plane of the drawing. The skirtboards 42 and 43 and their respective aprons 44 and 45 may be the same as in the station 20 illustrated in FIG. 1.

At the right-hand side of input station 50, FIG. 2, there is a fixed outer support member or stanchion 52 that extends upwardly at an acute angle from frame 38. Support member 52 may have an additional brace 54. On this side of input station 50 there are two belt support (slider) rails 56 that engage and support the outer right-hand side edge portion of belt 21. At the left-hand side of input station 50, FIG. 2, there is another angular lateral support member 53 that extends upwardly at an acute angle to base 38 and that may have a further brace 55. Two belt support (slider) rails 57 are mounted upon member 53. Supports 52 and 53 and their braces 54 and 55 are repeated several times through the length of input station 50, just like the rollers 31 of FIG. 1. Support rails 51, 56 and 57 usually extend for the full length of the input station 50.

Operation of input station 50 (FIG. 2) is much like that of input station 20 (FIG. 1). In each instance, bulk material 24 is discharged into the input station between skirtboards 42 and 43 and onto belt 21; see FIG. 4. The bulk material 24 is carried out of the input station on belt 21, on conveyor run 28, toward the discharge location 23; again, see FIG. 4. In input station 50, FIG. 2, as in station 20 of FIG. 1, the material is confined by skirtboard aprons 44 and 45, which limit leakage at the outer edges of the belt 21. With respect to edge leakage, station 50 of FIG. 2 is better than station 20 of FIG. 1 because the conveyor belt 21 is flatter, as it moves through input station 50, than in station 20. Stated differently, each of the outermost belt support rails 56 and 57 of station 50, FIG. 2, affords a more consistent engagement with the skirtboard aprons 44 and 45 than is possible with the construction of input station 20, FIG. 1, where there is inevitably some sag between rollers 32 and 33 at the opposite sides of the input station. On the other hand, though input station 50 has less leakage than station 20, and may also afford some improvement with respect to possible impact damage, it also increases the drag on conveyor belt 21 as that belt moves through the input station. Thus, wear on the conveyor belt 21 is higher with the construction shown in FIG. 2 than in FIG. 1. Power requirements for the conveyor system are also usually higher.

Figure 3:
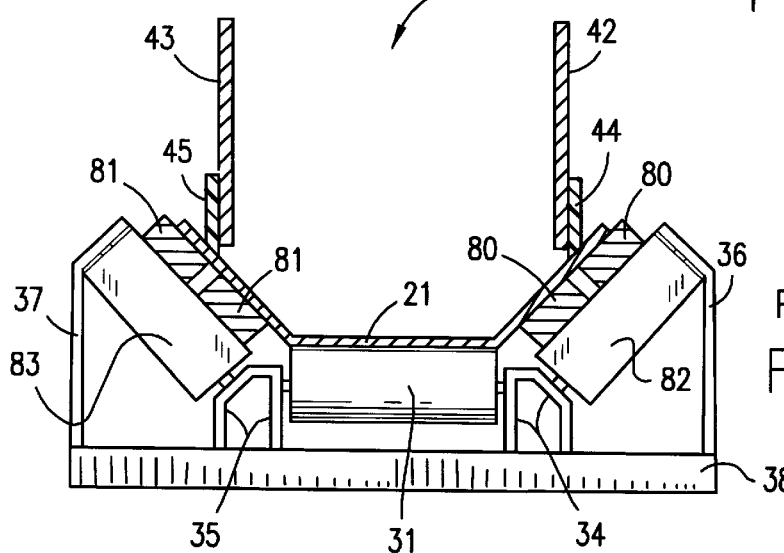

FIG. 3 illustrates another known form of input station 70, using the conversion kit of Arch U.S. Pat. No. 5,350,053. In this instance, the frame member 38 and stanchions 34 and 35 support a plurality of control rollers 31 down the center of the input station. As with FIG. 1, it is assumed that the direction of movement of conveyor belt 21 in FIG. 3 is toward the plane of the drawing. The skirtboards 42 and 43 and their respective aprons 44 and 45 may be the same as in the stations 20 and 50 illustrated in FIGS. 1 and 2, respectively. The center portion of the conveyor belt 21 in station 70, FIG. 3, is supported on rollers 31 as in FIG. 1.

At the right-hand side of input station 70, FIG. 3, there is a fixed support member or stanchion 36 that is mounted on and extends upwardly from frame member 38. Stanchion 36 is aligned with an inner stanchion 34. On this right-hand side of station 70, as shown in FIG. 3, there are two belt support rails 80 that engage and support all of one outer right-hand edge portion of belt 21. Rails 80 are mounted on a series of fixed support members 82 that bridge supports 34 and 36. At the left-hand side of input station 70, FIG. 3, there are two aligned support members 35 and 37 that extend upwardly from base 38 and are connected by a fixed support member 83. Two further belt support rails 81 are mounted upon member 83. As with FIGS. 1 and 2, the illustrated construction is repeated several times through the length of the input station 70, FIG. 3. Only one support 82 and one support 83 appear in FIG. 3. Rails 80 and 81 preferably extend for the full length of both sides of the input station 70.

Operation of input station 70 (FIG. 3) is much like that of input stations 20 and 50, FIGS. 1 and 2. Bulk material is discharged into the input station between skirtboards 42 and 43 and onto belt 21; see FIG. 4. The bulk material 24 is carried out of the input station 70 on belt 21 on conveyor run 28 toward the discharge location 23; again see FIG. 4. In input station 70, FIG. 3, as in the previously described input stations of FIGS. 1 and 2, the material on the conveyor belt is confined by skirtboard aprons 44 and 45, which limit leakage at the outer edges of the belt 21. With respect to edge leakage, station 70 of FIG. 3 is better than station 20 of FIG. 1 because the conveyor belt 21 is maintained essentially flat throughout the input station. On the other hand, though input station 70 shows less leakage and may be an improvement with respect to possible impact damage to the belt, it does increase the drag on conveyor belt 21 somewhat as the belt moves through the input station, relative to station 20 of FIG. 1. But input station 70, FIG. 3, can exhibit unduly high friction for wide, heavily loaded conveyor belts, particularly belts over four feet wide.

Description of the Preferred Embodiment
(FIGS. 5 and 6)

FIGS. 5 and 6 show an input station 100 constructed in accordance with a preferred embodiment of the present invention. Input station 100 combines features from the previously known input stations of FIGS. 1–3, and affords significant improvements over those prior known constructions as applied to wide, heavily loaded conveyor belts. In the input station 100, conveyor belt 21, moving in the direction of the arrow X (FIG. 5), is again maintained in an open, upwardly facing, generally U-shaped configuration. Station 100 is best used with wide conveyor belts, belts that are five feet or more in width. However, it is also usable with belts that are but four foot in width). For narrower conveyor belts, the input station 70 (best 3) is usually best.

The fixed supporting frame for belt 21 in input station 100, FIGS. 5 and 6, is much the same as for the prior input stations of FIGS. 1–3. The frame for station 100 includes the base members 38, the center stanchions 34 and 35, the right-hand side stanchions 36 and the left-hand side stanchions 37 (one stanchion 37 appears in FIG. 5). Four center stanchions 34 are shown in the portion of input station 100 illustrated in FIG. 5, along with four outer stanchions 36. It will be recognized, however, that the overall length of input station 100 may be substantially greater than shown in FIG. 5 and that there may be more stanchions than illustrated.

In input station 100, FIG. 5 and 6, there are a series of central belt support rollers 31. However, there are no side belt support rollers like the rollers 32 and 33 of FIG. 1. At the right-hand side of input station 100, there are a plurality of troughing rollers 110 (FIGS. 5 and 6). Each troughing roller 110 bridges a fixed medial support member 112 and a fixed center stanchion 34. Each medial support member 112 may be a length of angle iron bent at its upper end.

In the construction illustrated in FIGS. 5 and 6 there are two mounting bolts 116 extending upwardly through each of a series of fixed rail support members 118. Each member 118 bridges a medial support member 112 and an outer stanchion 36. Each bolt 116 has an enlarged head 120 that is positioned within an elongated C-shaped steel channel rail base 122. Each base rail 122 preferably extends for the full length of the input station; see FIG. 5. There is a nut 124 on each bolt 116, as shown in FIG. 6. Each slider rail base 122 supports a slider rail 140 which in turn supports the outer right-hand side of belt 21; FIGS. 5 and 6. Each slider or support rail 140 includes a metal pad welded to the related base 122. The surface portion of each slider rail or belt support 140, however, is preferably a resin composition affording low friction with respect to conveyor belt 21, because the belt support rail engages and supports the bottom surface of an outer edge portion of the conveyor belt. A preferred material for use in the belt-contacting portion of each belt support rail 140 is a urethane resin composition of high molecular weight (UHMW).

As best shown in FIG. 5, the left-hand skirtboard 43 for input station 100 may be equipped with a resilient apron 144 of the kind described and claimed in the aforementioned Gordon U.S. Pat. No. 4,789,727. The right-hand side of input station 100 has a skirtboard 42 and an apron 144 of like construction. Skirtboard 42 and its apron 144 are omitted in FIG. 5 for clarity of illustration. Skirtboard aprons 144 and 145, or other like skirtboard aprons, are subject to substantially less wear and work considerably more efficiently with the outer belt support rails of input station 100 than with a roller support that has the belt sagging between rollers, as in FIGS. 1 and 2.

At the left-hand side of station 100, FIG. 5, there is a fixed medial support member 113 between each pair of stanchions 35 and 37. The support members 113, like supports 112, are preferably lengths of angle iron and have mounting members that enable use of each support member 113 as a support for one end of a troughing roller 111. The troughing rollers 111 each extend between a center stanchion 35 and a medial support 113. In station 100 there are two belt support or slider rails 141 at the left-hand side of the input station, just as there are two belt support rails 140 at the right-hand side of the station. Any desired, configuration may be used for skirtboard 43 and its apron 145. That is equally true for skirtboard 42 and its apron 144.

The mounting means for the belt support or slider rails 141 at the left-hand side of input station 100, FIG. 5, are the same as for the right-hand side shown in FIG. 6. Again, the mounting means for rails 141 preferably includes a series of bolts, not shown, one for each belt support rail 141 on each rail support member 119. The rail supports 119 each extend between a medial fixed support 113 and an outer stanchion 37. Thus, there are two sets of mounting means exemplified by the bolts 116 on the right-hand side and similar bolts on the left-hand side of input station 100 for mounting the belt support rails 140 and 141 on the lateral support members 118 and 119 to support the outer edge portions of conveyor belt 21 at an acute angle relative to the horizontal center portion of the conveyor belt. It is preferred that each of the rails 140 and 141 extends throughout the length of the input station 100. However, this is not essential; the input station 100 can be constructed in longitudinal sections if desired.

As will be apparent from the foregoing description, it is readily possible to convert any prior art input station like those shown in FIGS. 1–3 to the input station construction of the invention, station 100 of FIGS. 5 and 6. The modification may retain the existing fixed frame members, such as frame members 38, stanchions 34 36. Skirtboards 42 and 43 and their aprons may also be retained. The aprons 44 and 45 are preferably replaced by improved aprons 144 and 145, as shown in FIGS. 5 and 6, but this is not essential.

What is necessary is the replacement of the side support rollers 32 and 33 of the conventional input station 20 of FIG. 1, the side support rails 54 and 57 of FIG. 2, and/or the side support rails 80 and 81 of FIG. 3. This is done with the medial fixed supports 112 and 113, the lateral support members 118 and 119, the troughing rollers 110 and 111, and the outer belt support or slider rails 140 and 141. Each support member 118 and 119 should be mounted between one medial support 112 and an outer stanchion 36 or between one medial support 113 and its outer stanchion 37. The troughing rollers 110 (and 111) each span a medial support 112 (or 113) and its related inner stanchion 34 (or 35). Also needed are two sets of belt support rails 140 and 141, with their bolts 136 or other mounting means to mount those rails on the lateral support members 118 and 119. The invention is useful with belts over four feet in width; for narrower belts, the construction of Arch U.S. Pat. No. 5,350,053 (FIG. 3) is preferred.

I claim:

1. An improved input station for a belt conveyor of the kind including a continuous closed-loop conveyor belt having a width greater than four feet, the conveyor belt moving in a given direction through an input station in a conveyor run, around a head pulley at a discharge location distant from the input station, and back into the input station in an empty return run around a tail pulley, the improved input station comprising:

a plurality of N fixed frame members each extending transversely of the width of the conveyor belt;

2N fixed outer stanchions, each pair of outer stanchions being mounted on and projecting upwardly of a fixed frame member beyond the outer edge of the conveyor belt;

2N fixed inner stanchions, each pair of inner stanchions mounted in spaced relation to each other and in spaced relation to a pair of the outer stanchions;

2N medial support members, each medial support member disposed between an outer stanchion and its related inner stanchion;

N horizontal center rolls, each extending between one pair of inner stanchions, the center rolls supporting a central portion of the conveyor belt through the input station;

2N troughing rollers, each troughing roller extending between an inner stanchion and a medial support member, the troughing rollers supporting two inner side portions of the conveyor belt throughout the input station;

2N belt support rails, each belt support rail extending throughout the input station to support an outer side portion of the conveyor belt;

and 2N sets of mounting means, one for each belt support rail, for mounting each belt support rail between the outer stanchions and the medial stanchions.

2. An input station for a belt conveyor, according to claim 1, in which each set of mounting means includes a rail support member mounted between an outer stanchion and its associated medial support member and at least one mounting bolt for affixing one belt rail to the rail support member.

3. An input station for a belt conveyor, according to claim 1, in which the top surface of each belt support rail at one side of the conveyor belt is aligned with the top surface of the adjacent troughing roller.

4. An input station for a belt conveyor, according to claim 3, in which each belt support rail extends for the full length of the input station.

5. An input station for a belt conveyor, according to claim 1, in which the input station further comprises:

two skirtboards extending along opposite sides of the input station above the outer edges of the conveyor belt; and two resilient skirtboard aprons, one on each skirtboard extending downwardly from its skirtboard into contact with the upper surface of the conveyor belt.

* * * * *